United States Patent [19]

Froc

[11] Patent Number: 5,033,398
[45] Date of Patent: Jul. 23, 1991

[54] AIR SEEDER BOOT

[75] Inventor: Maurice Froc, Melfort, Saskatchewan, Canada

[73] Assignee: Froc Enterprises Ltd., Melfort, Canada

[21] Appl. No.: 607,615

[22] Filed: Nov. 2, 1990

Related U.S. Application Data

[63] Continuation of Ser. No. 419,957, Oct. 11, 1989, abandoned.

[30] Foreign Application Priority Data

Oct. 21, 1988 [CA] Canada ................................ 580898

[51] Int. Cl.$^5$ ............................ A01C 5/06; A01C 5/08
[52] U.S. Cl. .................................... 111/152; 111/124; 111/188; 111/176
[58] Field of Search ................ 111/123, 124, 121, 34, 111/73, 80, 150, 152, 154, 155, 156, 163, 164, 167, 168, 175, 176, 186, 187, 188; 406/195, 41, 181, 86

[56] References Cited

U.S. PATENT DOCUMENTS

| | | | |
|---|---|---|---|
| 2,889,788 | 6/1959 | Van Dorn | 111/186 X |
| 4,373,455 | 2/1983 | Friggstaad | 111/150 |
| 4,388,878 | 6/1983 | Demzin | 111/186 |
| 4,424,757 | 1/1984 | Gibbens | 111/186 X |
| 4,473,016 | 9/1984 | Gust | 406/41 X |
| 4,592,294 | 6/1986 | Dietrich | 111/123 |
| 4,608,933 | 9/1986 | Wzritt | 111/152 |
| 4,633,791 | 1/1987 | Lindstrom et al. | 111/152 |
| 4,685,843 | 8/1987 | Kelm | 406/181 |
| 4,686,914 | 8/1987 | Schaaf et al. | 111/154 X |
| 4,711,187 | 12/1987 | Schultz | 111/7 |
| 4,770,112 | 9/1988 | Neumeyer | 111/186 X |

FOREIGN PATENT DOCUMENTS

| | | | |
|---|---|---|---|
| 157985 | 10/1953 | Australia | 111/152 |
| 199182 | 4/1920 | Canada . | |
| 236091 | 12/1923 | Canada . | |
| 262540 | 7/1926 | Canada . | |
| 308243 | 2/1931 | Canada . | |
| 806531 | 2/1969 | Canada . | |
| 840146 | 4/1970 | Canada . | |
| 1237948 | 6/1988 | Canada . | |
| 65150 | 3/1928 | Sweden | 111/154 |

Primary Examiner—Danton D. DeMille
Attorney, Agent, or Firm—Murray E. Thrift; Stanley G. Ade; Adrian D. Battison

[57] ABSTRACT

An air seeder boot includes a rigid pipe connected to the seed tube of the seeder and mounted to the back side of the cultivator shank by a bracket fixed to the front of the pipe. The pipe has an obtuse bend bringing the seed outlet to a position at approximately the same level as the top edges of the seep and between the sweep wings. The pipe usually has a crease along the back, up to the outlet, to divert seed into two rows in the most soil under the sweep wings. The open pipe of the boot provides reliable seed delivery without blockages.

11 Claims, 3 Drawing Sheets

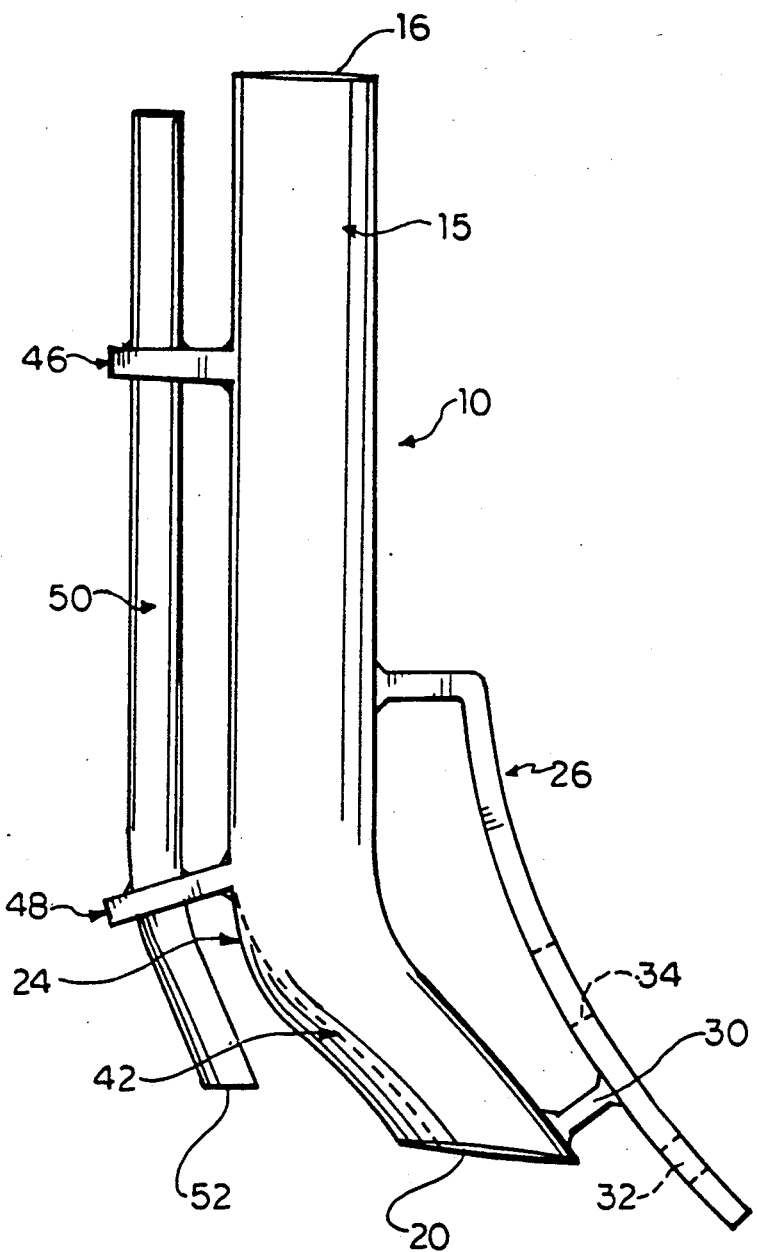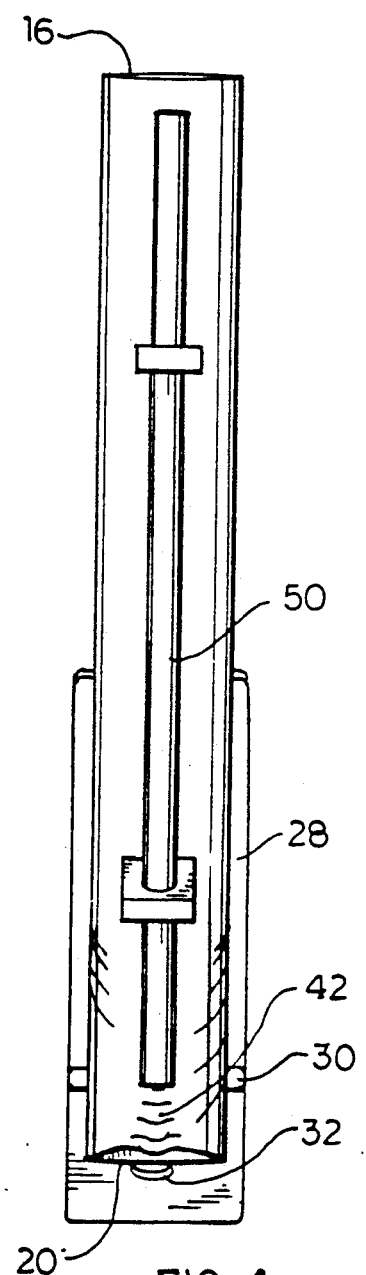

AIR SEEDER BOOT

This application is a continuation of application Ser. No. 419,957, filed Oct. 11, 1989 now abandoned.

FIELD OF THE INVENTION

The present invention relates to seeder boots for delivering seed from the seed tube of an air seeder to the ground adjacent a soil opening sweep.

BACKGROUND

In air seeders, the configuration of the seeder boot may have a detrimental effect on the placement of seed in the furrow. For example, some boots project the seeds rearwardly or straight down and tend to produce excessive seed scatter and bounce. A high percentage of seeds ends up in a dry soil flowing over the cultivator sweep. These seeds will only germinate much later when more rainfall is received, causing second growth. This creates a great problem of green, immature kernels in the harvested crop, downgrading the crop drammatically. Many boots include deflectors that extend across the seed outlet to deflect seed to either side, thus producing two spaced rows of seed. The deflectors damage, bounce and scatter the seed and will also stagnate the seed flow through the boot and can cause complete seed tube blockage. Similar problems occur where the sweep mounting bolts are extended through the boot to connect the boot and sweep to a cultivator shank.

Another difficulty that can arise with seed boots is that of exposure. Where parts of the boot are not hidden behind the shank on which they are mounted, hang ups and damage to the boot can result from engagement of the boot with rocks, stubs or soil lumps coming of the sweep and passing the shank.

The present invention is concerned with the provision of an improved air seeder boot.

SUMMARY

According to the present invention there is provided a seeder boot for delivering seed from a seed tube of a seeder to the ground adjacent a soil opening sweep mounted on a shank, said boot comprising a rigid pipe with an inlet end for connection to the seed tube, an outlet end and an obtuse bend between the inlet and outlet ends such that the lower part of the pipe adjacent the outlet end extends forwardly of the inlet end, and mounting means entirely on the outside of the pipe for mounting the pipe on the shank, whereby the interior of the pipe is unobstructed by the mounting means.

The boot is mounted on the sweep shank with the outlet end of the boot between the ends of the sweep and at approximately the same level as the top edges of the sweep. The forward bend in the tube deflects seed into the moist ground forward and under the sweep where an even germination results. Because the boot has a completely open cross section throughout, there is no stagnation point where seed can become lodged, causing boot blockages. The tube is preferably mounted close to the shank and desirably has a narrow width so that its exposure to material coming off the shank is minimal, thus minimizing damage to the boot.

In preferred embodiments of the invention, the boot has a prominent starting midway crease along the back, at the tube bend and gradually becoming more pronounced as it continues down to the discharge end. This forms the seed or fertilizer flow pattern and directs the seed or fertilizer to both sides of the sweep preventing undue scattering of seed into the dry soil coming off the top of the sweep.

Where desired, the seeder boot can be equipped with a pair of apertured plates and a steel tube on the back side to carry liquid fertilizer or chemicals behind the seed boot, at a level intermediate between the seed and the top surface of the soil or for a deep banding fertilizer.

BRIEF DESCRIPTION OF THE DRAWINGS

In the accompanying drawings, which illustrate exemplary embodiments of the present invention:

FIg. 3 is a side elevation of the seeder boot alone;

FIG. 4 is a rear elevation of the seeder boot; and

DETAILED DESCRIPTION

Figure 1:
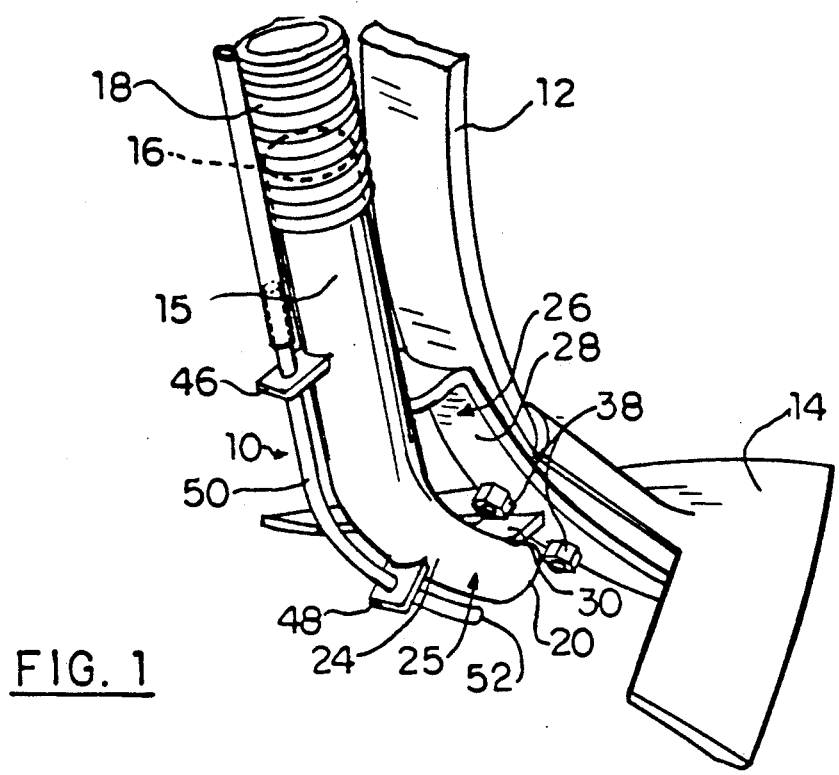
FIG. 1 is an isomeric view from the rear of a seeder boot according to the present invention mounted on a cultivator shank with a sweep.
Figure 2:
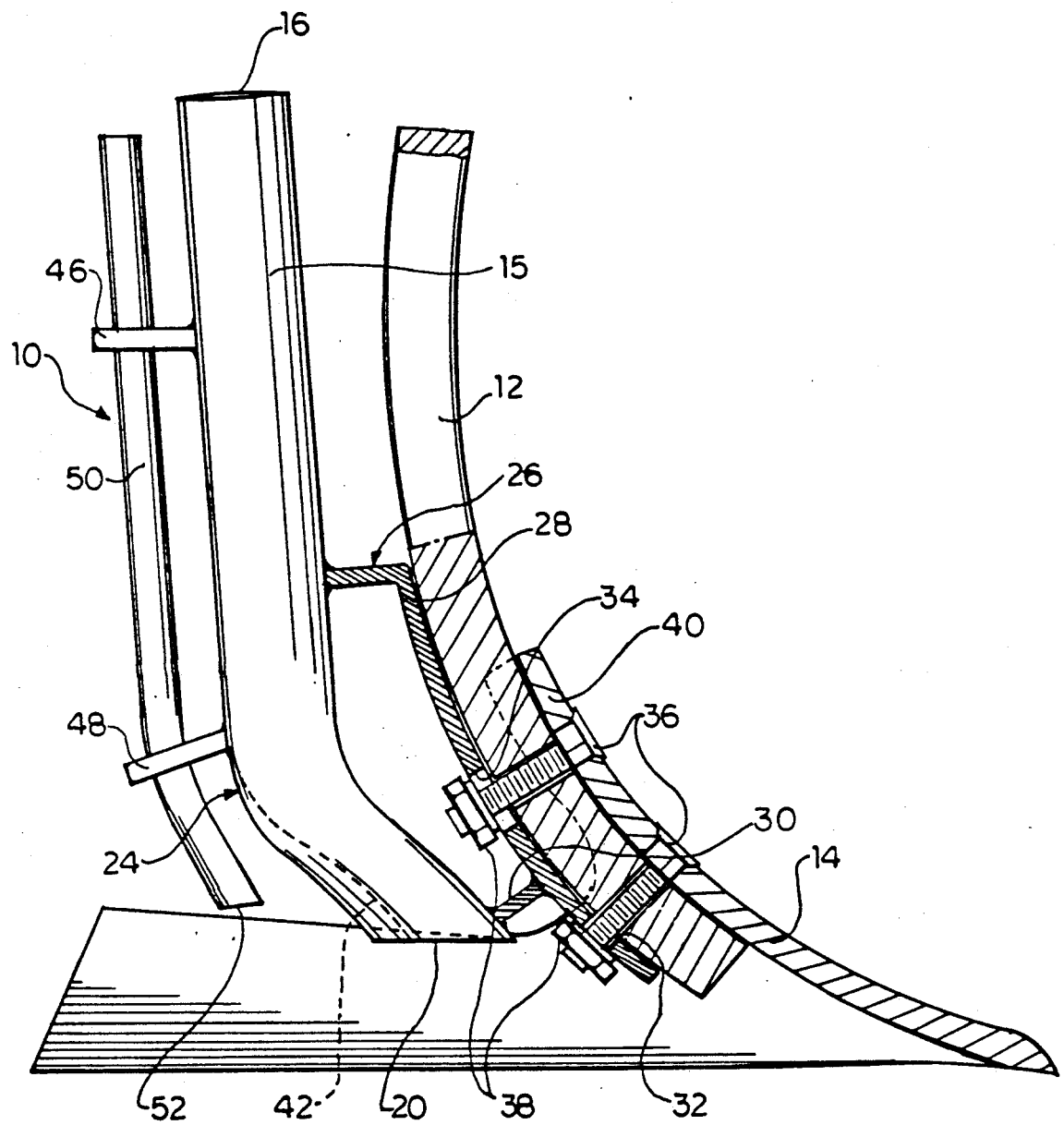
FIG. 2 is a side elevation, partially in section of the boot mounted as in FIG. 1.

Referring to the accompanying drawings, and especially to FIGS. 1 and 2, there is illustrated a seeder boot 10 mounted on cultivator shank 12 carrying a sweep 14. The boot includes a pipe 15 with an inlet end 16 connected to a seed tube 18 of the seeder. The opposite outlet end 20 of the boot is located between the wings of the sweep and at approximately the same level as their top edges, as can be seen most readily from FIG. 2. The outlet end 20 of the boot is oblique to the adjacent part of the boot pipe. Between its ends, the boot pipe has an obtuse bend 24 that directs the lower part 25 of the pipe towards the front, between the sweep wings.

The seeder boot includes a bracket 26 that mounts the boot on the shank 12. This bracket is a flat bar 28 slightly narrower than the shank that lies along back face of the shank. The upper end of the bar is bent over to provide a spacer that is welded to the front of the seeder boot pipe, while the lower end of the boot pipe is secured to the bar with a spacer 30.

The bar 28 has a mounting aperture 32 and a slot 34 that receive the mounting bolts 36 for the sweep. The bar 28 is held in place against the back face of the shank by nuts 38. The combination of a slot and a circular bolt hole allows the boot to be mounted on a range of shank and sweep combinations. As illustrated in FIG. 2, the bolts 36 are flat head bolts that seat in counter sinks in the sweep shank 40 to secure the sweep to the cultivator shank 12 in the conventional way.

Figure 5:
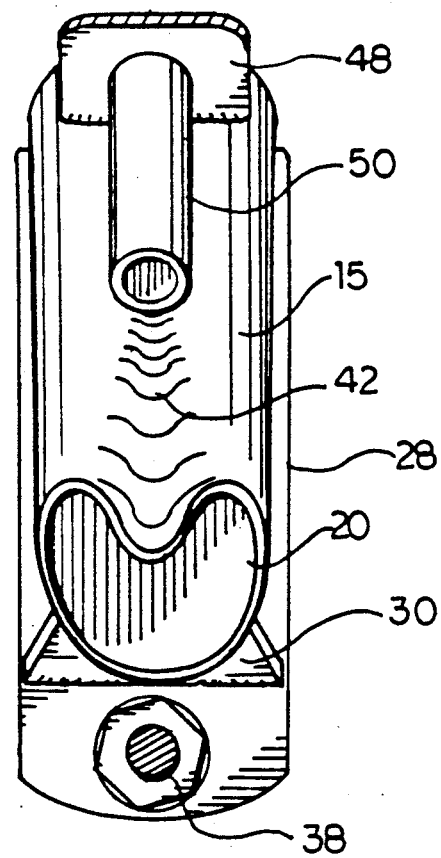
FIG. 5 is a view of the outlet end of the boot.

As illustrated most particularly in FIGS. 3, 4 and 5, the seeder boot pipe has a crease 42 running centrally along its back face, along the bend and the lower part of the tube up to the outlet end 20. The crease gradually increases in depth from the bend to the outlet end 20. This crease produces a double lobed outlet as illustrated most particularly in FIG. 5.

The tube itself is slightly narrower than the bar 28 and shank 12 so that rocks, stubs or lumps of soil coming off of the shank and the sweep do not engage the seeder boot. The bend 24 in the seeder tube pipe deflects seed forwardly into the moist soil under the sweep 14. The crease 42 in the back of the pipe separates most of the seed flow into two rows spaced some inches apart. Because neither the deflector nor the mounting bolt obstruct the free passage of seed through the boot, there is not stagnation point where seed can become lodged, ultimately causing tube blockages.

On the back of the seeder the tube pipe are two brackets 46 and 48 projecting to the rear. These carry a fertilizer tube 50 that extends along the back side of the seed pipe and curves to the front behind the obtuse bend in the seed pipe. The fertilizer tube is arranged to deposit fertilizer below the surface of the soil but above the level of the seed. To achieve this, the fertilizer outlet 52 is positioned slightly above the seed outlet and slightly to the rear of the sweep. The fertilizer tube and its mounting brackets are optional components that may be omitted if desired.

In the use of the seed boot, seed travelling along the seed pipe is deflected forwardly by the obtuse bend 24 into the moist soil under the sweep. The crease 42 along the back of the seed pipe directs the seed into two spaced rows under opposite sides of the sweep without producing an undue scattering of seed into the dry soil coming off the top of the sweep. The seed falls into two spaced rows at opposite sides of the sweep. Fertilizer deposited above the seed is located above and between the two rows.

For deep banding purposes the crease at the back of the seed tube may be eliminated, thus making the boot suitable for banding a narrow band of materials as well.

While one particular embodiment of the present invention has been illustrated in the foregoing, it is to be understood that other embodiments are possible within the scope of the invention, which is defined in the accompanying claims.

We claim:

1. A seeder boot for delivering seed from a seed tube of a seeder to the ground adjacent a soil opening sweep mounted on a shank, said boot comprising a rigid pipe with an upper part having an inlet end for connection to the seed tube, a lower part oriented at an obtuse angle to the upper part and having an outlet end and a bend between the upper and lower parts such that the lower part of the pipe adjacent the outlet end extends forwardly of the inlet end, a crease along a rearward side of the bend and the lower part only of the pipe, extending to the outlet end, the crease increasing in depth from the bend to the outlet end and mounting means entirely on the outside of the pipe for mounting the pipe on the shank, whereby the interior of the pipe is unobstructed by the mounting means.

2. A seeder boot according to claim 1 wherein the mounting means are secured to a forward side of the tube.

3. A seeder boot according to claim 2 wherein the mounting means comprise a bar extending along the front of the pipe, spacers extending between and connected to the pipe and the bar and means on the bar for engaging a plurality of sweep mounting bolts.

4. A seeder boot according to claim 3 wherein the pipe has a diameter less than the width of the bar.

5. A seeder boot according to claim 1 including means for mounting a fertilizer tube on the pipe.

6. A seeder boot according to claim 5 wherein the means for mounting fertilizer tube on the pipe comprise fertilizer tube brackets secured to the tube and projecting to the rear thereof.

7. A seeder boot according to claim 1 wherein the outlet end is oriented at an oblique angle to the lower part of the pipe.

8. A seeding apparatus comprising the combination of a shank, a sweep having wings with top edges, the sweep being mounted on the shank, and a seed boot mounted on a back side of the shank, said seed boot comprising a rigid pipe with an upper part having an inlet end, a lower part oriented at an obtuse angle to the upper part and having an outlet end, a bend between the upper and lower parts, and a crease along the rearward side of the lower part of the pipe, extending to the outlet end, the crease increasing in depth from the bend to the outlet end, and mounting means entirely on the outside of the pipe and mounting the pipe on the shank with the lower part extending forwardly from the upper part, between the wings of the sweep.

9. An apparatus according to claim 8 wherein the mounting means comprise a bar extending along the front of the pipe, spacers extending between and connected to the bar and pipe, and mounting bolts extending through the sweep, the shank and the bar and securing the sweep and seeder boot to the shank.

10. An apparatus according to claim 9 wherein the outlet end of the pipe is oriented at an oblique angle to the lower part of the pipe.

11. An apparatus according to claim 10 wherein the outlet end of the pipe is at substantially the same level as the top of the sweep wings.

* * * * *